April 17, 1962  R. Z. ANDERSON ETAL  3,030,047
COIL ACCOMMODATING AND DISPENSING DEVICE
Filed July 30, 1959  2 Sheets-Sheet 1

INVENTOR.
RALPH Z. ANDERSON
RICHARD A. MEYER, SR.
BY Gust & Irish
ATTORNEYS

April 17, 1962 R. Z. ANDERSON ETAL 3,030,047
COIL ACCOMMODATING AND DISPENSING DEVICE
Filed July 30, 1959 2 Sheets-Sheet 2
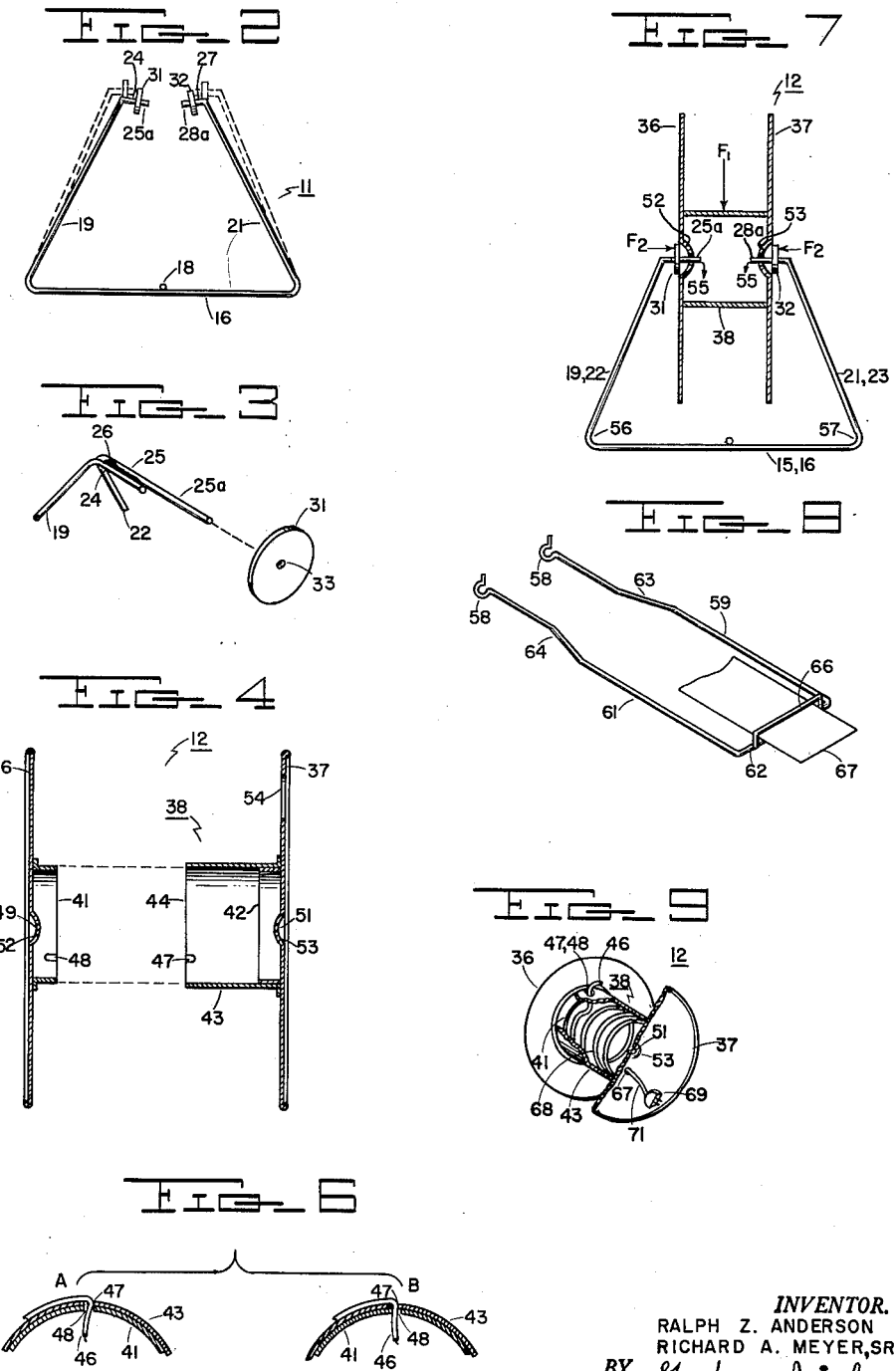
INVENTOR.
RALPH Z. ANDERSON
RICHARD A. MEYER, SR.
BY Gust & Irish
ATTORNEYS United States Patent Office 3,030,047
Patented Apr. 17, 1962

3,030,047
COIL ACCOMMODATING AND DISPENSING DEVICE
Ralph Z. Anderson, Hamilton, and Richard A. Meyer, Sr., Fort Wayne, Ind.; said Anderson assignor to said Meyer, doing business as La-Ra-Co, Fort Wayne, Ind.
Filed July 30, 1959, Ser. No. 830,559
11 Claims. (Cl. 242—94)

This invention relates to a device for accommodating a coil formed of a continuous length of elongated material, such as wire, rope or webbing, and for dispensing the same in a straight line.

There are numerous instances in manufacturing and in the building trades where it is necessary to employ substantial lengths of elongated material, such as tape, webbing, rope, cable or wire; it is genrally highly desirable that such material, when used, be in straight continuous lengths, without kinks or bends. Such elongated material, particularly electrical wire employed in the wiring of buildings, is commonly supplied in the form of a coil packaged in a cardboard carton. It has been common practice to utilize such wire directly out of the carton, and thus, as the wire is pulled off of the coil, whether it be from the inside or the outside thereof, it tends to retain its helical configuration, thus necessitating the application of considerable pull or tensile force in order to straighten out the wire, such pulling frequently resulting in kinks in the wire and damage to the insulation. Furthermore, this method of employing packaged wire is not only time consuming, but often results in short lengths of wire remaining in the carton and ultimately being wasted. While the foregoing difficulties are particularly true in the case of electrical wire and cable employed in the wiring of buildings, they are also, to a greater or lesser extent true in the case of other elongated materials, such as rope, tape and webbing employed in various manufacturing operations.

It is therefore highly desirable to provide a readily portable tool or device which will accommodate a coil formed of a continuous length of elongated material and which will dispsense the same in a straight line responsive to a straight pull without the formation of undesirable kinks or bends. While numerous reel-type devices have been proposed in the past for dispensing an elongated strand-like material, such as electrical wire, to the best of the present applicants' knowledge, all such devices have been subject to a common defect, i.e., the lack of suitable braking action; if the wire or other material is merely wound upon a reel freely rotatable upon a frame or support, when pull is exerted on the material in order to dispense a length thereof from the reel, the reel tends to continue to rotate, thus paying off an undesired quantity of the wire, rope or tape onto the floor. On the other hand, in those instances known to the present applicants where an effort has been made to provide a braking action, the braking force has either been uniform regardless of the quantity of material on the reel, or has increased as the quantity decreased, with the result that excessive braking force was provided after the reel was partly depleted, with the result that exertion of a pull on the material being paid out caused the entire device to be pulled along the floor. It is therefore further desirable that a device of the type here under consideration incorporate means providing braking action with the braking force being directly proportional to the weight of material on the reel. Furthermore, since as indicated above, the material to be accommodated and dispensed normally is supplied by the manufacturer in coiled form, it is desirable that the coil accommodating and dispensing device be arranged so that the coil of material to be accommodated and dispensed can be bodily placed on the reel, i.e., without necessity for unwinding the material from its original coil and in turn winding it upon the dispensing reel. It is, of course, additionally desirable that such a tool be readily portable, and economical to manufacture and ship.

It is accordingly an object of our invention to provide an improved device for accommodating and dispensing a coil formed of a continuous length of elongated material.

Another object of our invention is to provide an improved device of the character described incorporating the desirable features enumerated above.

Further objects and advantages of our invention will become apparent by reference to the following description and the accompanying drawings, and the features of novelty which characterize our invention will be pointed out with particularity in the claims annexed to and forming a part of this specification.

In the drawings:

FIG. 3 is a fragmentary view in perspective showing the assembly of the braking plates on the supporting frame;

FIG. 4 is a cross-sectional view of the reel of FIG. 1, showing the two-parts separated;

FIG. 5 is a fragmentary exploded view in perspective showing the positioning of a preformed coil of electrical wire onto the hub portion of the reel of our invention;

FIGS. 6(A) and (B) are fragmentary cross-sectional views showing the starting end retaining feature of the reel of our invention;

FIG. 7 is a schematic cross-sectional view of our device illustrating the braking action provided thereby;

FIG. 8 is a view in perspective of the carrying handle and strand guiding member of our invention modified to accommodate a flat tape or web; and FIG. 9 is a fragmentary view in perspective, partly broken away, illustrating another feature of our invention.

Figure 1:
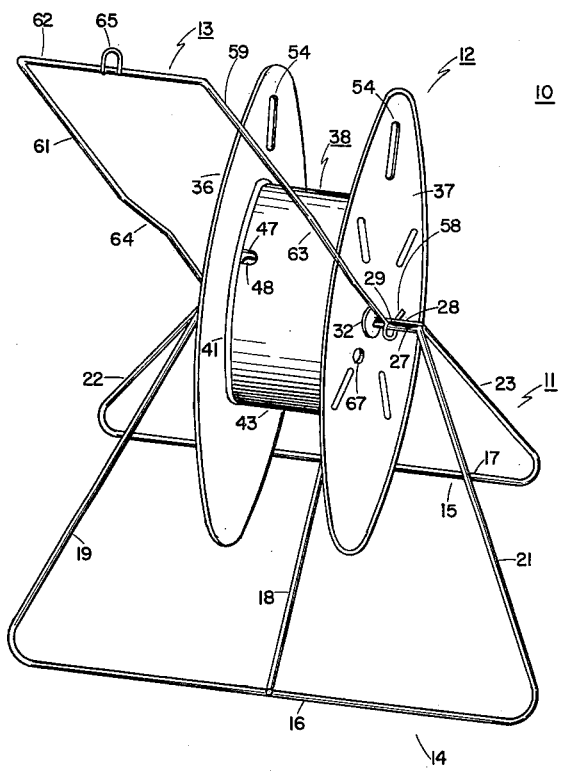
FIG. 1 is a view in perspective showing our improved device for accommodating and dispensing a coil formed of a continuous length of elongated material.

Referring now to FIG. 1 of the drawing, our improved elongated material accommodating and dispensing tool or device, generally identified at 10 comprises a supporting frame 11, a two-part axially separable reel 12 and a carrying handle and guide member 13.

Figure 2:
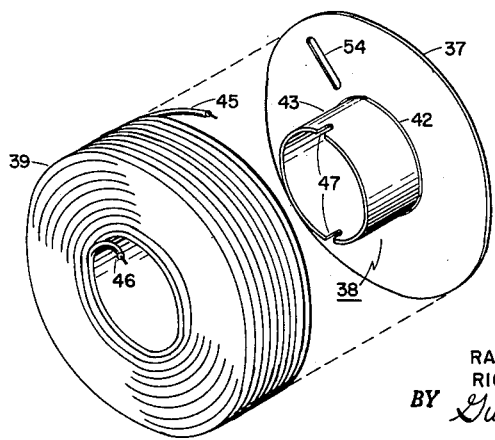
FIG. 2 is an end view of the supporting frame of the device of FIG. 1.

Referring now additionally to FIGS. 2 and 3, supporting frame 11 is preferably formed of two generally U-shaped bent wire elements 14 and 15 with their bight portions 16 and 17 held in spaced parallel relationship by a transverse member 18 secured to the bight portions 16 and 17 in any suitable manner, as by welding, bight portions 16 and 17 thus form the base for the supporting frame 11, being adapted to support the device on the ground or floor. The frame elements 14 and 15 have generally upstanding leg portions 19, 21 and 22, 23 respectively. Leg portions 19 and 22 have their upper extremities terminating in inwardly extending portions 24 and 25 (FIG. 3) secured together in any suitable manner, as by a weld 26 and leg portions 21 and 23 likewise have their upper extremities terminating in inwardly extending portions 27 and 28 secured together by a weld 29. It will be observed that the inwardly extending portions 24, 25 and 27, 28 respectively extend toward each other along generally the same axis. As best seen in FIG. 3, inwardly extending portions 25 and 28 of leg portions 22 and 23 project inwardly beyond portions 24 and 27. A pair of flat annular braking plates 31 and 32 are provided each having a central opening 33 formed therein so that braking plates 31, 32 may be positioned on portions 25a and 28a of inwardly extending portions 25 and 28, braking plates 31 and 32 being respectively secured thereto in any suitable manner, as by welding. As best seen in FIG. 2, portions 25a and 28a of inwardly extending portions 25 and 28 of leg portions 22 and 23 form spindles for rotatably supporting reel 12. As is further best seen in FIG. 2, leg portions 19, 22 on one side and 21, 23 on the other side of supporting frame 11 are inclined inwardly, the normal spacing between braking plates 31 and 32 before reel 12 has been assembled on supporting frame 11 being less than the width of reel 12. Since frame 11 is formed of wire, it will be readily seen that the leg portions 19, 22 and 21, 23 are resilient and that they thus can be deflected outwardly, as shown in dashed lines in FIG. 2

Referring now additionally to FIGS. 4, 5 and 6, reel 12, which is preferably fabricated from relatively thin sheet metal, is formed by two annular discs or end plates 36 and 37 joined by a hollow cylindrical hub portion 38; the portions of discs 36 and 37 extending radially beyond hub portion 38 thus constitute the flanges of reel 12. In order to provide for axial separation of reel 12 into two parts to permit bodily positioning a prewound coil 39 on hub 38, the arrangement now to be described is provided. A cylindrical flange 41 is coaxially secured to the inner surface of disc 36 in any suitable manner, as by spot welding, and a similar cylindrical flange 42 is likewise coaxially secured to the inner surface of disc 37. A cylindrical or tubular member 43 is then fitted over cylindrical flange 42 and secured thereto in any suitable manner, as by spot welding, as best seen in FIG. 4. Cylindrical member 43 thus effectively forms hub 38. End 44 of cylindrical member 43 thus may have a relatively tight slip-fit over cylindrical flange 41 to form the completed spool. It will now be readily seen with particular reference to FIG. 5, when disc 36 with its attached cylindrical flange 41 has been removed from cylindrical member 43 and its attached disc 37, a preformed coil 39 of material, such as electrical wire 45, may be bodily positioned over cylindrical member 43 and the other disc 36 again attached to complete the reel by inserting its cylindrical flange 41 within end 44 of cylindrical member 43.

In order to accommodate and retain starting or tail end 46 of the coil 39 of wire 45, a pair of notches 47 are diametrically oppositely formed in edge 44 of cylindrical member 43 and a pair of similar diametrically oppositely disposed notches 48 are formed in the cylindrical flange 41. Referring now additionally to FIG. 6, it will be observed that when coil 39 is initially assembled on cylindrical member 43, starting end 46 of wire 45 is initially seated in one of the notches 47. Cylindrical flange 41 attached to the other disc 36 is then inserted within end 44 of cylindrical member 43 with its notches 48 respectively in axial alignment with notches 47 of cylindrical member 43, as shown in FIG. 6(A). After disc 36 has thus been assembled on cylindrical member 43 to complete the assembly of reel 12, by virtue of the slip-fit provided between cylindrical flange 41 and cylindrical member 43, discs or flanges 36 and 37 may be relatively rotated in opposite directions thereby displacing notches 47 and 48 tightly to grip starting end 46 of wire 45, as seen in FIG. 6(B).

In order to provide bearings for rotatably supporting reel 12 from spindles 25(a), 28(a) of supporting frame 11, bearing openings 49 and 51 are respectively coaxially formed in discs or end flanges 36 and 37, as best seen in FIG. 4. Further, in order to facilitate assembly of reel 12 on supporting frame 11, the areas immediately surrounding bearing openings 49 and 51 of disc 36 and 37 are inwardly dished or recessed, as at 52 and 53 respectively. Recesses 52 and 53 therefore provide an automatic center-seeking feature for guiding spindles 25(a) and 28(a) respectively into the bearing openings 49 and 51 for rotatably supporting reel 12. Elongated radial slots 54 are also formed in discs or end flanges 36 and 37 in order more accurately to gauge or measure the quantity of wire or other material upon the reel 12.

It will now be observed that reel 12 is simply installed on or removed from supporting frame 11 by merely deflecting leg portions 19, 22 and 21, 23 of supporting frame 11 outwardly, as suggested by dashed lines 34 and 35 in FIG. 2 until the spindles 25(a) and 28(a) are received in recesses 52, 53 and ultimately into bearing openings 49 and 51 in discs or end flanges 36, 37. It will now be further seen that by virtue of the resilient characteristic of leg portions 19, 22, and 21, 23 of supporting frame 11 contributed by their inwardly inclined configuration, breaking plates 31, 32 respectively apply inwardly directed forces upon discs or end flanges 36, 37 of reel 12. Referring now particularly to FIG. 7, it will be seen that any downward force, as shown by arrow $F_1$, applied to reel 12 is in turn exerted downwardly on spindles 25(a) and 28(a) of frame 11 thus in turn tending to deflect leg portions 19, 22 and 21, 23 downwardly and inwardly in the direction shown by the arrows 55 about their junctions 56, 57 with bight or base portions 15, 16 of supporting frame 11. This downward and inward deflection of leg portions 12, 22 and 21, 23 likewise causes braking plates 31 and 32 to be moved inwardly against discs or end flanges 36, 37 of spool 12, thus respectively applying braking forces $F_2$ as shown in FIG. 7. It will now further be readily apparent that the greater the force $F_1$, the greater will be the braking forces $F_2$ applied by the braking plates 31, 32 to the discs or end flanges 36, 37 of spool 12. Thus, it will be observed that the braking force applied by the braking plates 31, 32 is directly proportional to the weight of the material on hub 38 of spool 12. Therefore, when spool 12 is full of material such as wire, a substantial braking force is applied by braking plates 31, 32, which braking force is progressively reduced as the material is dispensed from the reel 12.

Referring now again to FIG. 1, it will be seen that carrying handle and guide member 13 is again preferably formed of bent wire in a U-shaped configuration with hook portions 58 being respectively formed at the ends of its leg portions 59 and 61, hook portions 58 being respectively removably assembled over extension portions 24, 25 and 27, 28 of leg portions 19, 22 and 21, 23 of supporting frame 11. It will further be seen that leg portions 56 and 61 of the carrying handle and guide member 13 extend respectively outwardly along disc or flange member 36, 37 of reel 12 with bight portion 62 extending across reel 12 radially outwardly from its outer periphery. Further, it will be seen that leg portions 59, 61 of handle member 13 are provided with inwardly deformed portions 63 and 64 so that the hook portions 58 resiliently apply force on the outer surfaces of the braking plates 31, 32 thereby assisting in the prevention of accidental dislodgement of reel 12 from supporting frame 11.

A guiding loop 65 is attached to the bight portion 62 of handle member 13 through which the material being withdrawn or dispensed from reel 12 is fed. It will now be seen that since the elongated material being pulled off of the reel 12 is passed through loop 65 of handle and guiding member 13, member 13 acts as a tensioning device during paying out of the material from reel 12. It also will be readily seen that when the device 10 is to be carried, bight portion 62 of member 13 serves as a handle for manual carrying so that supporting frame 11 and reel 12 are suspended therefrom, and also, it will be seen that when the device is not in use, merely resting on the floor, member 13 will hang vertically downwardly from inwardly extending portions 24, 25 and 27, 28 with bight portion 62 disposed underneath reel 12. It will further be observed that two devices 10 can be carried by a single individual since, by virtue of the fact that there are no connecting members between legs 19, 22 or 21, 23, two assemblies can in effect be nested side-by-side with their handle members 13 in turn being in side-by-side relation so that they can be carried suspended from one hand.

Referring now briefly to FIG. 8, while the loop 65 on the handle and guiding member 13 of FIG. 1 is obviously intended for a strand-type material, such as wire or rope; handle 13 may be modified simply to accommodate flat tape or webbing-type material by merely substituting an elongated loop member 66 through which flat tape or webbing 67 is passed. It will also be readily apparent that two or more strands or tapes may be simultaneously accommodated on and dispensed from a single reel 12, in which event it is merely necessary to utilize a corresponding number of loops 65 or 66 of the proper configuration and size on the bight portion 62 of the handle and guiding member 13.

Referring now specifically to FIGS. 1 and 9, it will be observed that a small hole 67 is provided in disc or flange 37 communicating with the interior of hub 38. By means of this simple expedient, the starting end 46 of a coil of electrical cable (not shown) can have joined thereto a considerable length 68 of cable or electrical cord, which can be accommodated within the interior of hub portion 38. The length of cable 68 is in turn passed through the opening 67 and as shown in FIG. 9, if the cable accommodated on reel 12 is in the nature of an extension cord, an electrical plug 69 may be connected to the end 71 of length 68 which extends outwardly from disc or flange 37. Thus, when it is desired to utilize the extension cord accommodated on reel 12, end 67 can be pulled out with plug 69 being inserted in a suitable electrical outlet and contrarywise, when use of the extension cord is finished, the length 68 can be merely shoved into the interior of hub portion 38 through opening 67.

The particular reel shown in the drawings is intended primarily for electrical wire or cable of the type used in wiring dwelling houses and other buildings, the particular reel having an outside diameter of sixteen (16) inches with a four (4) inch traverse and a six and one-half (6½) inch diameter core or hub 38.

It will now be readily seen that by virtue of the provision of a two-part axially separable reel, the coil of material can be very speedily loaded on or unloaded from the reel, without requiring the loosening or tightening as the case may be, of nuts, bolts or other fastening devices. It will further be seen that the braking action provided by our improved device is strongest with a full reel of material, the braking action being directly proportional to the weight of material on the reel, and thus that there is no tendency for the device to slip on the floor responsive to withdrawal of material when the reel is only partly full or almost depleted of material. It will further be seen that the action of the braking plates is self-adjusting in nature and inherently accommodates any dynamic wobble of the reel. It will be readily apparent that the starting or tail end of the coil of material on the hub is retained or locked by virtue of the relative displacement of the notches in the cooperating cylindrical hub member and cylindrical flange. Finally, it will be observed that by virtue of the open construction of supporting frame 11, a plurality of such frames can readily be nested for economy in shipment and storage.

While we have illustrated and described specific embodiments of our invention, further modifications and improvements will occur to those skilled in the art and we desire, therefore, in the appended claims to cover all such modifications and improvements which do not depart from the spirit and scope of our invention.

What is claimed is:

1. A device for accommodating a coil formed of a continuous length of elongated material and for dispensing said material in a straight line comprising: a generally U-shaped supporting frame having a base portion joining a pair of generally upstanding resilient leg portions, and a pair of spaced generally parallel braking plates respfectively formed on the upper extremities of said leg portions; and a reel for accommodating and dispensing said coil of material and having a hub portion disposed between generally flat annular flange portions, and a pair of end plates respectively closing the ends of said hub portion; said reel being disposed between said frame leg portions; said braking plates respectively having reel-supporting spindles extending therefrom and said end plates respectively having cooperating bearing openings respectively formed therein for rotatably and removably supporting said reel on said frame; said frame leg portions being respectively inclined inwardly with the spacing between said braking plates being normally less than the spacing between said end plates so that said braking plates are resiliently urged into engagement with said end plates by said leg portions and the weight of said reel with said material thereon applies a downward force on said leg portions thereby causing said braking plates to apply a braking force on said end plates directly proportional to the amount of said material on said reel.

2. A device for accommodating a coil formed of a continuous length of elongated material and for dispensing said material in a straight line comprising: a generally U-shaped supporting frame having a base portion joining a pair of generally upstanding resilient leg portions, and a pair of spaced generally parallel braking plates respectively formed on the upper extremities of said leg portions; and a two-part axially separable reel for accommodating and dispensing said coil of material, said reel having a pair of spaced parallel generally flat annular flange portions, a hub portion having one end joined to one of said flange portions, means removably joining the other of said flange portions to the other end of said hub portion whereby said coil of material may be bodily positioned on said hub portion prior to joining of said other flange portion thereto, and a pair of end plates respectively closing the ends of said hub portion; said reel being disposed between said frame leg portions; said braking plates respectively having reel-supporting spindles extending therefrom and said end plates respectively having cooperating bearing openings respectively formed therein for rotatably and removably supporting said reel on said frame; said frame leg portions being respectively inclined inwardly with the spacing between said braking plates being normally less than the spacing between said end plates so that said braking plates are resiliently urged into engagement with said end plates by said leg portions and the weight of said reel with said material thereon applies a downward force on said leg portions thereby causing said braking plates to apply a braking force on said end plates directly proportional to the amount of said material on said reel.

3. A device for accommodating a coil formed of a continuous length of elongated material and for dispensing said material in a straight line comprising: a generally U-shaped supporting frame having a base portion joining a pair of generally upstanding resilient leg portions, and a pair of spaced generally parallel braking plates respectively formed on the upper extremities of said leg portions; and a two-part axially separable reel for accommodating and dispensing said coil of material, said reel having a pair of spaced parallel generally flat annular flange portions, a first hollow cylindrical hub portion having one end attached to one of said flanges, a second hollow cylindrical hub portion having one end attached to the other of said flanges, one of said hub portions being removably slip-fitted over the other of said hub portions whereby said coil of material may be bodily positioned on one of said hub portions prior to connection of the other hub portion thereto, and a pair of end plates respectively closing the ends of said hub portion; said reel being disposed between said frame leg portions; said braking plates respectively having reel-supporting spindles extending therefrom and said end plates respectively having cooperating bearing openings respectively formed therein for rotatably and removably supporting said reel on said frame; said frame leg portions being respectively inclined inwardly with the spacing between said braking plates being normally less than the spacing between said end plates so that said braking plates are resiliently urged into engagement with said end plates by said leg portions and the weight of said reel with said material thereon applies a downward force on said leg portions thereby causing said braking plates to apply a braking force on said end plates directly proportional to the amount of said material on said reel.

4. A device for accommodating a coil formed of a continuous length of elongated material and for dispensing said material in a straight line comprising: a generally U-shaped supporting frame having a base portion joining a pair of generally upstanding resilient leg portions, and a pair of spaced generally parallel braking plates respectively formed on the upper extremities of said leg portions; and a two-part axially separable reel for accommodating and dispensing said coil of material, said reel having a pair of spaced parallel generally flat annular flange portions, a hollow cylindrical hub having one end attached to one of said annular flanges, a cylindrical flange attached to the other of said annular flanges, said cylindrical flange being removably telescopically attached to the other end of said hub whereby said coil of material may be bodily positioned on said hub prior to attachment of said cylindrical flange thereto, said other end of said hub and said cylindrical flange respectively having notches formed in the edges thereof, said hub and said cylindrical flange being relatively rotatable after attachment thereby permitting alignment of said notches for reception of the starting end of said coil and subsequent misalignment of said notches for gripping and retaining said starting end, and a pair of end plates respectively closing the ends of said hub portion; said reel being disposed between said frame leg portions; said braking plates respectively having reel-supporting spindles extending therefrom and said end plates respectively having cooperating bearing openings respectively formed therein for rotatably and removably supporting said reel on said frame; said frame leg portions being respectively inclined inwardly with the spacing between said braking plates being normally less than the spacing between said end plates so that said braking plates are resiliently urged into engagement with said end plates by said leg portions and the weight of said reel with said material thereon applies a downward force on said leg portions thereby causing said braking plates to apply a braking force on said end plates directly proportional to the amount of said material on said reel.

5. A device for accommodating a coil formed of a continuous length of elongated material and for dispensing said material in a straight line comprising: a generally U-shaped supporting frame having a base portion joining a pair of generally upstanding resilient leg portions, and a pair of spaced generally parallel braking plates respectively formed on the upper extremities of said leg portions, said braking plates respectively having reel-supporting spindles extending inwardly therefrom; and a two-part axially separable reel for accommodating and dispensing said coil of material, said reel having a pair of spaced parallel generally flat annular discs, a hub portion having one end coaxially joined to one of said discs, means removably coaxially joining the other of said discs to the other end of said hub portion whereby said coil of material may be bodily positioned on said hub portion prior to joining of said other disc thereto; said reel being disposed between said frame leg portions; said discs respectively having bearing openings coaxially formed therein cooperating with said spindles for rotatably and removably supporting said reel on said frame; said frame leg portions being respectively inwardly inclined with the spacing between said bearing plates being normally less than the spacing between said discs so that said braking plates are resiliently urged into engagement with said discs by said leg portions and the weight of said reel with said material thereon applies a downward force on said leg portions thereby causing said braking plates to apply a braking force on said discs directly proportional to the amount of said material on said reel.

6. The combination of claim 1 in which the said end plates are respectively dished inwardly in the area surrounding said openings thereby facilitating insertion of said spindles therein.

7. The combination of claim 1 in which said hub portion has an opening therein communicating with the interior thereof for receiving one end of said coil of material and one of said end plates has an opening formed therein also communicating with the interior of said hub portion so that a length of said material joining said one end of said coil may be accommodated within said hub portion and withdrawn or inserted through said end plate opening.

8. A device for accommodating a coil formed of a continuous length of elongated material and for dispensing said material in a straight line comprising: a generally U-shaped supporting frame having a base portion joining a pair of generally upstanding resilient leg portions, each of said leg portions having an inwardly extending projection formed on its upper extremity, and a pair of spaced generally parallel braking plates respectively formed on the ends of said projections; a reel for accommodating and dispensing said coil of material and having a hub portion disposed between generally flat annular flange portions, and a pair of end plates respectively closing the ends of said hub portion; said reel being disposed between said frame leg portions; said braking plates respectively having reel-supporting spindles extending therefrom and said end plates respectively having cooperating bearing openings respectively formed therein for rotatably and removably supporting said reel on said frame; said frame leg portions being respectively inclined inwardly with the spacing between said braking plates being normally less than the spacing between said end plates so that said braking plates are resiliently urged into engagement with said end plates by said leg portions and the weight of said reel with said material thereon applies a downward force on said leg portions thereby causing said braking plates to apply a braking force on said end plates directly proportional to the amount of said material on said reel; and a generally U-shaped carrying handle member for said device having the ends of its leg portions respectively removably attached to said frame leg portion extensions, said handle member being rotatable with respect to said frame with its leg portions extending respectively along said reel flange portions and its bight portion extending across said reel beyond the outer periphery thereof.

9. The combination of claim 8 in which said handle leg portions are deformed inwardly thereby resiliency exerting inward forces on said braking plates whereby accidental dislodgement of said reel from said frame is prevented.

10. A device for accommodating a coil formed of a continuous length of elongated material and for dispensing said material in a straight line comprising: a supporting frame formed of two generally U-shaped bent wire elements respectively having their bight portions in spaced parallel relation and joined by at least one connecting rod member to form a base, the leg portions on each side of said bight portions being respectively secured together at their upper extremities to form two generally upstanding legs, the ends of at least two opposite leg portions extending inwardly toward each other, a pair of spaced generally parallel braking plates respectively attached to said ends, said braking plates respectively having reel-supporting spindles extending inwardly therefrom; and a reel for accommodating and dispensing said coil of material and having a hub portion disposed between generally flat annular flange portions, and a pair of end plates respectively closing the ends of said hub portion, said reel being disposed between said frame legs; said end plates respectively having bearing openings formed therein cooperating with said spindles for rotatably and removably supporting said reel on said frame; said frame legs being respectively inclined inwardly with the spacing between said braking plates being normally less than the spacing between said end plates so that said braking plates are resiliently urged into engagement with said end plates by said frame legs and the weight of said reel with said material thereon applies a downward force on said frame legs thereby causing said braking plates to apply a braking force on said end plates directly proportional to the amount of said material on said reel.

11. A device for accommodating a coil formed of a continuous length of elongated material and for dispensing said material in a straight line comprising: a supporting frame formed of two generally U-shaped bent wire elements respectively having their bight portions in spaced parallel relation and joined by at least one connecting rod member to form a base, the leg portions on each side of said bight portions being respectively secured together at their upper extremities to form two generally upstanding legs, the ends of two opposite leg portions extending inwardly toward each other, a pair of annular flat braking plates each having a central opening therethrough, said braking plates being respectively secured on said leg portion ends in spaced parallel relation with said ends extending inwardly beyond said braking plate openings to form reel supporting spindles; and a reel for accommodating and dispensing said coil of material and having a hub portion disposed between generally flat annular flange portions, and a pair of end plates respectively closing the ends of said hub portion; said reel being disposed between said frame legs; said end plates respectively having bearing openings formed therein cooperating with said spindles for rotatably and removably supporting said reel on said frame; said frame legs being respectively inclined inwardly with the spacing between said braking plates being normally less than the spacing between said end plates so that said braking plates are resiliently urged into engagement with said end plates by said frame legs and the weight of said reel with said material thereon applies a downward force on said frame legs thereby causing said braking plates to apply a braking force on said end plates directly proportional to the amount of said material on said reel.

References Cited in the file of this patent

UNITED STATES PATENTS

| | | |
|---|---|---|
| 2,472,248 | Cox | June 7, 1949 |
| 2,650,777 | Robbins | Sept. 1, 1953 |
| 2,908,453 | Stiles | Oct. 13, 1959 |

FOREIGN PATENTS

| | | |
|---|---|---|
| 252,920 | Great Britain | June 10, 1926 |